US011321338B2

(12) United States Patent
Okorafor et al.

(10) Patent No.: US 11,321,338 B2
(45) Date of Patent: May 3, 2022

(54) INTELLIGENT DATA INGESTION SYSTEM AND METHOD FOR GOVERNANCE AND SECURITY

(71) Applicant: Accenture Global Solutions Limited, Dublin (IE)

(72) Inventors: Ekpe Okorafor, Fairview, TX (US); Atish Ray, Herndon, VA (US); Nayanjyoti Paul, Piscataway, NJ (US); Naveen Gupta, Faridabad (IN); Sudhanshu Gupta, Mumbai (IN); Vineet Kumar, Moradabad (IN); Jayanta Das, Baraipur (IN); Amit Chandra Shrivastava, Benares (IN)

(73) Assignee: Accenture Global Solutions Limited, Dublin (IE)

( * ) Notice: Subject to any disclaimer, the term of this patent is extended or adjusted under 35 U.S.C. 154(b) by 536 days.

(21) Appl. No.: 16/298,719

(22) Filed: Mar. 11, 2019

(65) Prior Publication Data

US 2020/0019558 A1 Jan. 16, 2020

(30) Foreign Application Priority Data

Jul. 13, 2018 (IN) .............................. 201841026208

(51) Int. Cl.
*G06F 16/25* (2019.01)
*G06F 16/21* (2019.01)
(Continued)

(52) U.S. Cl.
CPC .......... *G06F 16/254* (2019.01); *G06F 16/211* (2019.01); *G06F 16/285* (2019.01); *G06F 21/6218* (2013.01); *G06N 5/04* (2013.01)

(58) Field of Classification Search
CPC .... G06F 16/254; G06F 16/211; G06F 16/285; G06F 21/6218; G06F 21/6254; G06F 16/258; G06N 5/04
See application file for complete search history.

(56) References Cited

U.S. PATENT DOCUMENTS

2012/0136806 A1   5/2012  Anderson et al.
2017/0329788 A1  11/2017  Grasselt et al.
(Continued)

FOREIGN PATENT DOCUMENTS

EP          3594822         1/2020

OTHER PUBLICATIONS

Communication pursuant to Rules 70(2) and 70 a(2) EPC and reference to Rule 39(1) EPC dated Jan. 20, 2020 for European Patent Application No. 19184823.3.
(Continued)

*Primary Examiner* — Beemnet W Dada
(74) *Attorney, Agent, or Firm* — Plumsea Law Group, LLC

(57) ABSTRACT

An intelligent data ingestion and governance method and system is disclosed. A set of data requirements is received from a user. The set of data requirements includes multiple different formats and corresponding location information indicating a plurality of corresponding different data sources. One or more data policies are also received from the user as part of the set of data requirements. A configuration file is automatically generated using the set of data requirements. A new dataset is retrieved from the plurality of corresponding different sources of data, using the generated configuration file. The retrieved dataset is classified, and metadata for the retrieved dataset is provided. Actionable policies are automatically generated using the metadata and the user defined data policies, and a compliance engine is
(Continued)

generated. Security of access to the retrieved input data is controlled using the generated compliance engine.

20 Claims, 9 Drawing Sheets

(51) Int. Cl.
    *G06F 16/28*     (2019.01)
    *G06F 21/62*     (2013.01)
    *G06N 5/04*     (2006.01)

(56) References Cited

U.S. PATENT DOCUMENTS

| | | | |
|---|---|---|---|
| 2018/0052861 A1* | 2/2018 | Seetharaman | ........ G06F 3/0649 |
| 2018/0101584 A1 | 4/2018 | Pattnaik et al. | |
| 2018/0121476 A1 | 5/2018 | Bakke et al. | |

OTHER PUBLICATIONS

Response filed on Apr. 14, 2020 to Communication dated Jan. 20, 2020 in European Patent Application No. 19184823.3.
First examination report dated Jan. 30, 2020 for Australian Patent Application No. 2019204976.
Notice of Acceptance for Patent Application dated Sep. 3, 2020 for Australian Patent Application No. 2019204976 (3 pp).
Extended European Search Report dated Nov. 26, 2019 for European Patent Application No. 19184823.3.
Response to 1st Examination Report as filed on Jul. 30, 2020 for Australian Patent Application No. 2019204976.
2nd Examination Report dated Aug. 20, 2020 for Australian Patent Application No. 2019204976.
European Communication pursuant to Article 94(3) EPC dated Nov. 16, 2020 for European Patent Application No. 19184823.3.

\* cited by examiner

INTELLIGENT DATA INGESTION SYSTEM AND METHOD FOR GOVERNANCE AND SECURITY

CROSS-REFERENCE TO RELATED APPLICATIONS

This application claims the benefit of India Provisional Patent Application Number 201841026208, filed Jul. 13, 2018, and titled "Intelligent Data Ingestion System and Method for Governance and Security," which is incorporated by reference herein in its entirety.

TECHNICAL FIELD

The present disclosure generally relates to an intelligent platform for ingesting and processing big data. More specifically, the present disclosure generally relates to a self-service platform for governance and security for big data.

BACKGROUND

As more and more data becomes available for providing information and insights for various users, it has become challenging to process big data to provide meaningful information to an end user. Furthermore, as more diverse sources of data may be of interest to particular users, it has become even more challenging to process data from multiple diverse sources, process the data, and extract and display meaningful information from the data.

For example, a user may be interested in determining relationships among customers, company products, credit bureau information, and various other items, which may have information stored in different formats, and/or in different storage facilities. Such varying sorts of information may be stored in specific configurations, including specific formats, in specific volumes, etc. Conventionally, a user may need to spend several months just developing code to access the various data sources. Furthermore, the user may need to develop more code to ingest the data and process the data to tag it and/or extract metadata. If the user employs open source code to save time in coding, issues may arise in connecting various different components together. Further, each open source component may require its own format for input and output, causing further expenditures in time, money, and computing resources to try to build a successful system. Keeping track of the lineage of the data may be very difficult using such code. Further, it may be difficult to keep audit trails using such a patchwork of components.

There is a need in the art for a system and method that addresses, at least, the shortcomings discussed above.

SUMMARY

An intelligent data ingestion and governance system and method is disclosed. The intelligent data ingestion and governance system and method solves the problems discussed above by automating ingestion and processing of the data in a platform that provides end-to-end automated processing, from data onboarding to processed data consumption and integration. Specifically, the system and method facilitate the ingestion and management of big data in a centralized data storage system, such as a data lake. A user only needs to provide the requirements for the desired data that is located at multiple different data sources, and in multiple different data formats, through a user interface. The submission of the requirements information triggers the onboarding process, generating a configuration file for the various different data sources and data formats, and automatically establishing access to the multiple different data sources to onboard the data, thus triggering the processing of the data through an automated end-to-end pipeline.

The method of intelligent data ingestion and governance includes receiving a set of data requirements from a user. The set of data requirements includes multiple different formats and corresponding location information indicating one or more different sources of data. A configuration file is automatically generated using the set of data requirements. A new dataset is retrieved from the plurality of corresponding different sources of data, using the generated configuration file. The method further includes automatically initiating classification of the retrieved dataset to classify the retrieved dataset and to provide metadata for the retrieved dataset. Actionable policies are automatically generated using the metadata, and a compliance engine is generated. Security of access to the retrieved dataset is controlled using the generated compliance engine.

The system and method further allow users to input pre-defined or customized data policies (e.g., data curation rules). These data policies are automatically converted into executable code that is used to process the dataset based on how the dataset has been classified.

Further, in some embodiments, audit trails are automatically generated, as the pipeline is fully automated. Additionally, in some embodiments, lineage of the data may be tracked as it is processed.

The system and method provide a framework for automation, intelligence, reusability, low-code and high efficiency in building and deploying a data engineering platform. The system and method focus on modular design and a reusable component architecture that is easily customizable to user demands without code changes. This flexibility and advantage may be leveraged to provide timely and innovative solutions for end users seeking to obtain actionable information from their big data.

Because the exemplary system and method utilize dynamically generated classifications and executable code for user selected data policies, the system and method can automatically reprocess data dynamically. For example, the data can be automatically reprocessed as the context of the data changes with the onboarding of additional datasets and/or the creation of new relationships between existing datasets. Therefore, curated datasets that may be accessible to users through a searchable database are dynamic and may be reprocessed in real time as the relationships between data sets in a common data lake evolve over time.

In one aspect, a method for intelligent data ingestion and governance within a data repository includes steps of: (1) receiving a set of data requirements for a new dataset from a user, the set of data requirements including location information for a data source and a data policy; (2) automatically generating a configuration file using the received set of data requirements; (3) automatically initiating retrieval of the new dataset from the data source using the generated configuration file; (4) automatically saving the retrieved dataset in the data repository; (5) automatically identifying and extracting a set of metadata from the retrieved dataset; (6) automatically classifying the retrieved dataset and identifying the retrieved dataset with a first classification; (7) automatically saving the set of metadata and the first classification; (8) automatically retrieving the data policy from the configuration file and converting the data policy into executable code; (9) automatically processing the retrieved dataset using the executable code to generate a curated dataset; and (10) automatically saving the curated dataset in the data repository, wherein the curated dataset is accessible to one or more users.

In another aspect, a system for intelligent data ingestion and governance includes a device processor and a non-transitory computer readable medium storing instructions. The instructions are executable by the device processor to implement: (1) an intelligent governance portal that receives a set of data requirements from a user, the set of data requirements including location information for a data source and a data policy; (2) a universal ingestion module that automatically initiates retrieval of a new dataset from the data source, using the generated configuration file; (3) a classification module that initiates extracting metadata from the retrieved dataset and classification of the retrieved dataset; and (4) a compliance engine module that automatically generates a compliance engine and controls security of access to the retrieved dataset using the generated compliance engine.

In still another aspect, a non-transitory computer-readable medium storing software includes instructions. The instructions are executable by one or more computers and cause the one or more computers to: (1) receive a set of data requirements for a new dataset from a user, the set of data requirements including location information for a data source and a data policy; (2) generate a configuration file using the received set of data requirements; (3) initiate retrieval of a new dataset from the data source using the generated configuration file; (4) save the retrieved dataset in a data repository; (5) extract a set of metadata from the retrieved dataset; (6) classify the retrieved dataset and identify the retrieved dataset with a first classification; (7) save the metadata and the first classification; (8) retrieve the data policy from the configuration file and convert the data policy into executable code; (9) process the retrieved dataset using the executable code to generate a curated dataset; and (10) save the curated dataset in the data repository.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
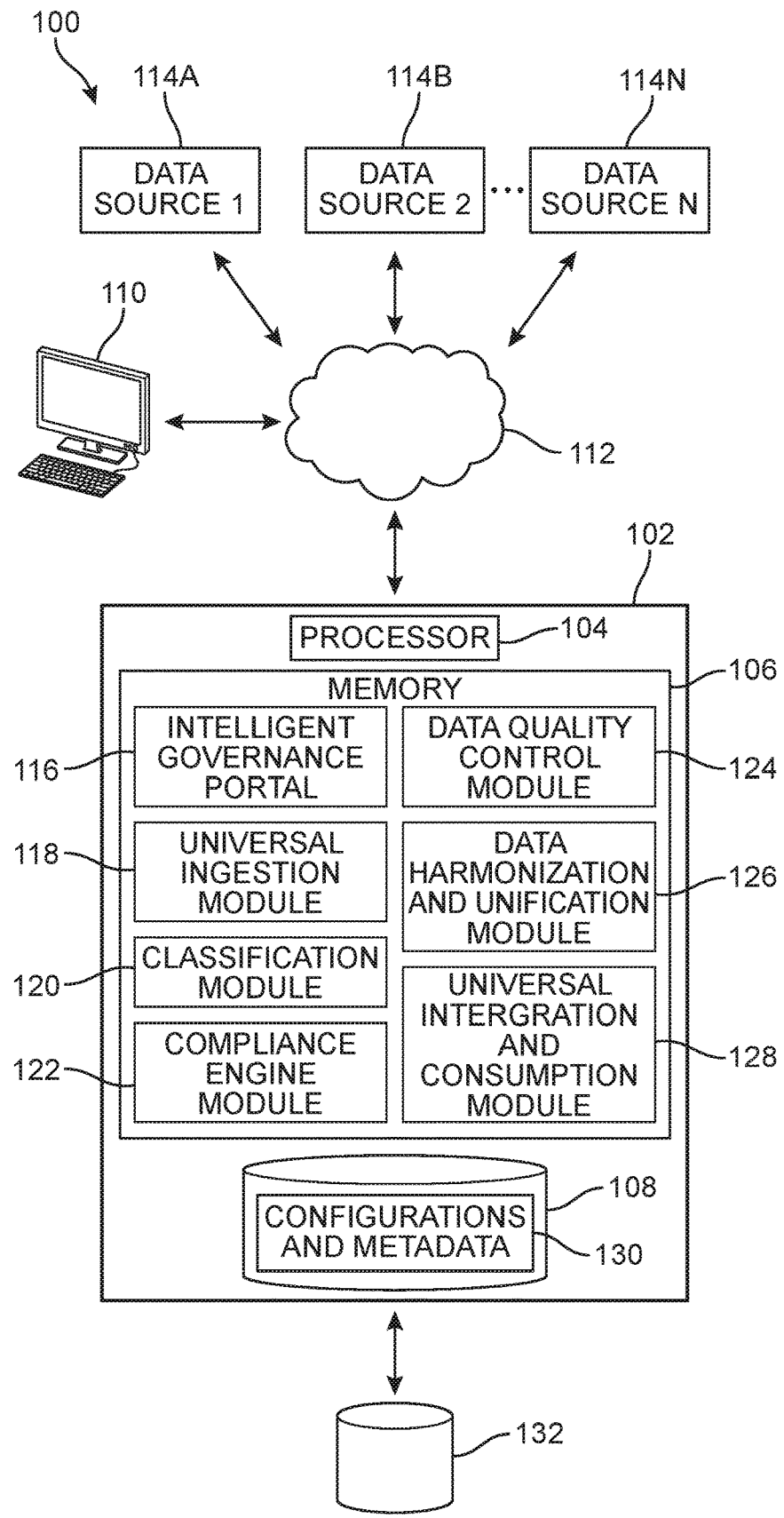
FIG. 1 is a block diagram of an embodiment of an intelligent data ingestion and governance system.
Figure 2:
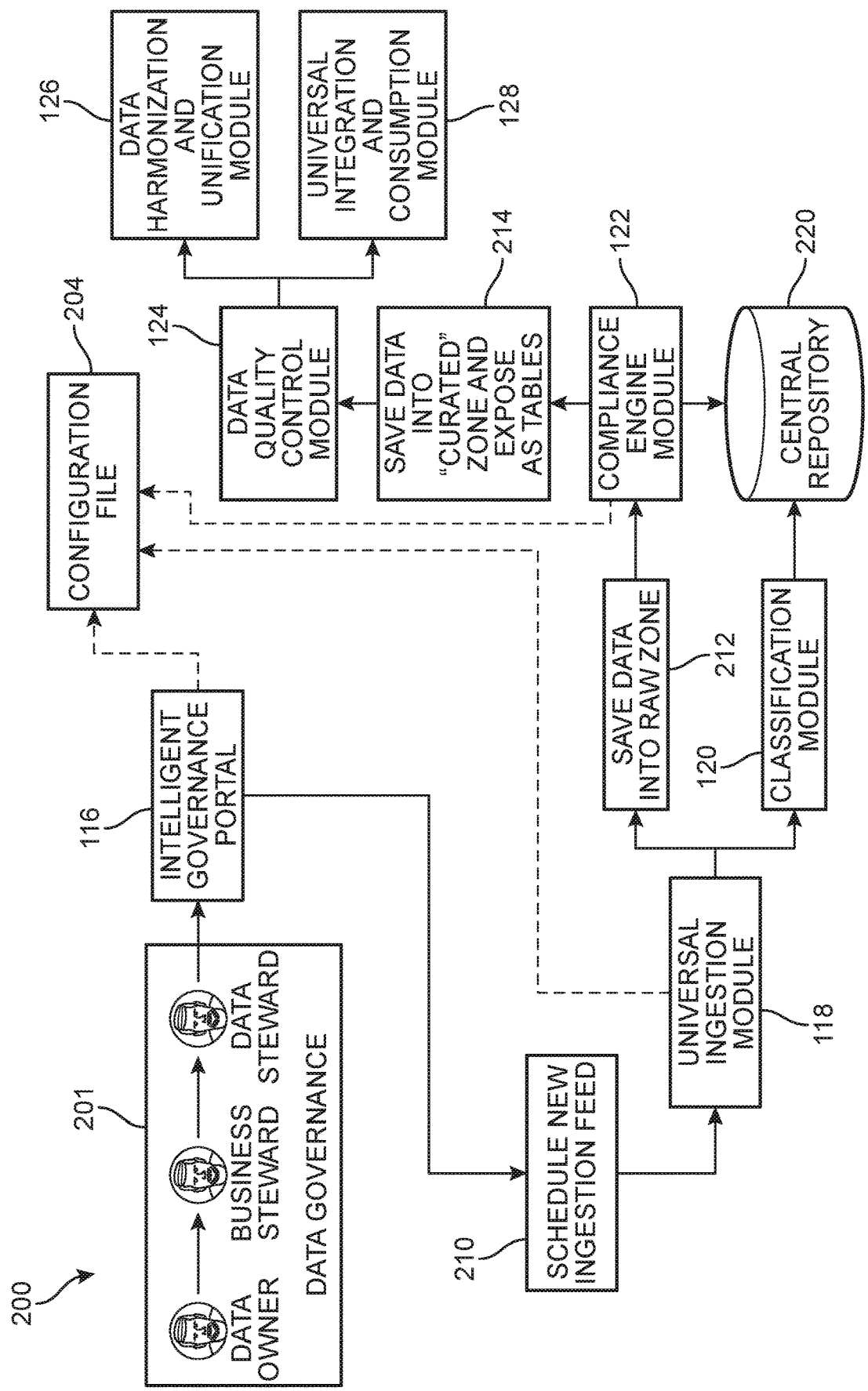
FIG. 2 is a schematic diagram indicating the flow of information through the intelligent data ingestion and governance system of FIG. 1, according to one embodiment.

A system and method for intelligent data ingestion and governance is disclosed. FIGS. 1-2 depict schematic views of the overall system, while FIGS. 3-10 are directed towards systems and methods associated with two specific modules of the overall system: an extraction and classification module and a compliance engine module.

FIG. 1 shows an embodiment of configuration 100 for moving and processing data within a data repository 132 using an intelligent data ingestion and governance system 102, also referred to simply as system 102. As shown in the embodiment of FIG. 1, system 102 includes a processor 104, a memory 106 storing components of system 102, and an internal data repository 108 (e.g., a database). System 102 may communicate with a user device 110, for example, to receive user input. For example, system 102 may communicate with user device 110 via a network 112. In some embodiments, network 112 may be a wide area network ("WAN"), e.g., the Internet. In other embodiments, network 112 may be a local area network ("LAN"). For example, in a more remote location far from a metropolitan area, the Internet may not be available. In yet other embodiments, network 112 may be a combination of a WAN and a LAN.

Data repository 132 could comprise any kind of system for storing data. In some embodiments, data repository 132 could be a data lake. As used herein, the term "data lake" refers to a data repository that comprises a single store of all data in its natural format (e.g., data blobs or files) as well as transformed data (e.g., reports, analytics, etc.). Although the exemplary embodiment depicts data repository 132 as being distinct from intelligent data ingestion and governance system 102, in other embodiments data repository 132 could be considered a part of system 102 (or vice versa).

As shown in FIG. 1, system 102 may communicate with multiple different data sources, including data source 114a, data source 114b, through an arbitrary nth data source data source 114n, for example, to onboard data of various data types and formats, from multiple different sources. For example, different data types may include data describing customers, data describing company products, data describing products on sale at various outlets, credit bureau information, and various other items, which may have information stored in different formats, in different storage facilities.

As shown in FIG. 1, system 102 may include several modules. For example, an intelligent governance portal 116 may provide a user interface that may prompt a user to provide input specifying, at least, a set of data requirements from a user. For example, the set of data requirements may include location information for a data source and format information for datasets located at the data source. For example, the user interface may display a form on a display of user device 110 that provides questions for the user to answer. For example, the user may provide information specifying multiple different types/formats of data, and access information specifying where the data may be accessed, as well as how the data may be accessed for onboarding to the system.

Based on information input by the user, intelligent governance portal 116 may automatically generate a configuration file using the received set of data requirements. Intelligent governance portal 116 may then trigger the automatic retrieval/onboarding of the data that was specified by the user. In some cases, the configurations of configuration file may be stored in repository 108 as part of configurations and metadata 130. In this way, the user has no need to spend expensive resources writing code to onboard the data (e.g., 2-3 months of coding development, plus expenses of coding, etc.). In some embodiments, the user may also control permissions for any datasets within the user interface. In some embodiments, the user interface may be implemented using a Representational State Transfer (REST) API. Thus, the user is provided with "one stop" data management, as the system is automated after the user provides the initial input of the set of data requirements.

As shown in FIG. 1, a universal ingestion module 118, also referred to simply as "ingestion module 118", may automatically initiate retrieval of datasets from one or more data sources (e.g., data source 114a, data source 114b and data source 114n), using the generated configuration file. In some embodiments, universal ingestion module 118 may adapt automatically to any data type and data source. In some embodiments, universal ingestion module 118 may automatically handle any data type, data structure, and/or data format, without human intervention or special coding for each user. Moreover, ingested data may be stored in data repository 132, which may reside within the system 102, or separately (e.g., in the cloud). In this way, system 102 may provide alerting and monitoring on demand, audit trails, lineage tracking, and/or search and find services to users.

As shown in FIG. 1, an extraction and classification module 120, also referred to simply as "classification module 120", may initiate classification of the retrieved dataset to classify the retrieved dataset and to provide metadata for the retrieved dataset. In some embodiments, classification module 120 may provide pattern driven tags identification and association. For example, the metadata may provide context for the data to provide value to the data. In some embodiments, a metadata extraction engine may employ natural language based scanning and automatic pattern identification. In some embodiments, classification module 120 may use a statistical library for technical information extraction and key performance indicators (KPIs). In some embodiments, classification module 120 may use artificial intelligence and a machine learning (ML) model for dynamic data classification. In some embodiments, classification module 120 may automatically generate actionable policies using the metadata provided by the classifying of the retrieved input data. As indicated in FIG. 1, in some embodiments metadata may be stored as part of configurations and metadata 130 in repository 108.

As shown in FIG. 1, a compliance engine module 122 may automatically generate a compliance engine using the generated plurality of actionable policies, and may control security of access to the retrieved input data using the generated compliance engine. In some embodiments, an intelligent compliance engine may use the metadata to encrypt, tokenize, and/or deidentify information. For example, the intelligent compliance engine may be driven by artificial intelligence. In some embodiments, a distributed processing engine may automatically run curation rules in a parallel distributed manner. In some embodiments, compliance engine module 122 may provide dynamic rules management to easily update (e.g., add/modify/delete) rules on demand without changing any code driving the compliance engine. For example, compliance engine module 122 may initiate distributed curation rules processing to curate the retrieved datasets based on the provided metadata, using artificial intelligence processing.

As shown in FIG. 1, a data quality control module 124 may control data quality based on an actionable metadata driven policy for data quality analysis, using artificial intelligence processing. In some cases, the artificial intelligence processing uses the provided metadata as input. In some embodiments, a centralized consistency, correctness, and completeness check is performed on the processed data received from compliance engine module 122. In some embodiments, automatized rules are used for enhancing data quality using statistical methods (e.g., median, average, etc.).

As shown in FIG. 1, a data harmonization and unification module 126 may generate unified and harmonized processed datasets using a knowledge graph. In some embodiments, data harmonization and unification module 126 is driven by artificial intelligence techniques. For example, the knowledge graph may be a connected 360 knowledge graph. In some embodiments, materialized and semantic views and access patterns are provided. In some embodiments, data harmonization and unification module 126 may provide domain based unification and harmonization. For example, the graph database may include a NoSQL database.

As shown in FIG. 1, a universal integration and consumption module 128 may use intelligent integration patterns to integrate the processed data. In some embodiments, universal integration and consumption module 128 may integrate and consume the processed data using universal integration and consumption patterns.

Although not shown in FIG. 1, an automated pipeline may be provided as data/processing flows from intelligent governance portal 116 to universal ingestion module 118, to classification module 120, to compliance engine module 122, to data quality control module 124, to data harmonization and unification module 126, and then to universal integration and consumption module 128 for externalization. Thus, a user is provided with an end-to-end platform, from data collection to consumption. The user need only answer questions presented by intelligent governance portal 116 (e.g., with regard to the multiple different data sources), and the submission of the response to the questions automatically triggers the onboarding process, to collect and process the data from the multiple different data sources through the automated pipeline.

In some example embodiments, the components of the intelligent data ingestion and governance system may communicate among themselves through a network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN.

In some embodiments, the intelligent data ingestion and governance system may include a server. The server may be a single computer, the partial computing resources of a single computer, a plurality of computers communicating with one another, or a network of remote servers (e.g., cloud). In some embodiments, the server may be in communication with a database and/or a data repository.

FIG. 2 is a schematic view of the overall flow of data 200 and related information through the intelligent data ingestion and governance system as the data is ingested and made accessible within a data lake.

The process starts at the intelligent governance portal 116. This module provides a user-interface for users 201 (such as data owners, business stewards, or data stewards) who want to onboard or register a new data source into a data repository, hereafter referred to as a data lake. In some embodiments, the portal may provide questions related to the authenticity and other governance process related to the data registration. Using this portal, the system gathers source information for retrieving the data, as well as a set of data requirements for governance of the data. Source information can include, for example, information about where the data is currently hosted (e.g., in the cloud), any credentials needed to access the data (e.g., username and password), and the data format (e.g., CSV). The portal also allows for stakeholders to state one or more data policies using a simple natural language. As used herein, the term "data policy" simply refers to one or more rules for governing data. In one example, discussed in further detail below, a data policy could be to hide social security numbers and other sensitive information so that this information is not viewable when the data is searched by external users.

Once the data request has been submitted and approved successfully, a downloadable configuration file 204 gets generated. This file captures all the details (staging, ingestion, rules-engine etc.) in a unified manner. In some cases, the configuration file could be a JavaScript Object Notation (JSON) file. At this point, an ingestion process is scheduled by a scheduling system 210.

At the time appointed by scheduling system 210, ingestion module 118 is called to retrieve the dataset. Ingestion module 118 will store the raw retrieved dataset into a raw zone 212 of the data lake. This ensures that a raw version of the dataset is maintained in the data lake separately from any curated data generated at later stages of the process.

Once ingestion module 118 has completed the data retrieval process, classification module 120 begins to extract metadata and classify the dataset. This module and its associated processes are described in further detail below. Information, including metadata, classification information, data tags and labels, and any other suitable information may be stored in a central repository 220. This central repository may be a database or other storage system that may be accessible to various other modules in system 100.

After ingestion module 118 has extracted all metadata, classified the dataset and stored relevant data in a central repository, compliance engine module 122 may be called. As discussed in further detail below, compliance engine module 122 uses data policies to process the dataset according to its classification(s). As indicated in FIG. 2, compliance engine module 122 may access metadata, classification information and/or other kinds of information that has been stored in central repository 220. The output of this module is a curated dataset that is stored in a curated data zone 214 of the data lake. In some embodiments, this curated dataset can be exposed as data tables for access by other modules and/or users of the system. For example, curated datasets may be exposed as "hive tables" associated with the Apache Hadoop framework.

Once the curated dataset has been generated by compliance engine module 122, data quality control module 124 proceeds to check the data. The data can then be further processed by data harmonization and unification module 126 and universal integration and consumption module 128.

Figure 3:
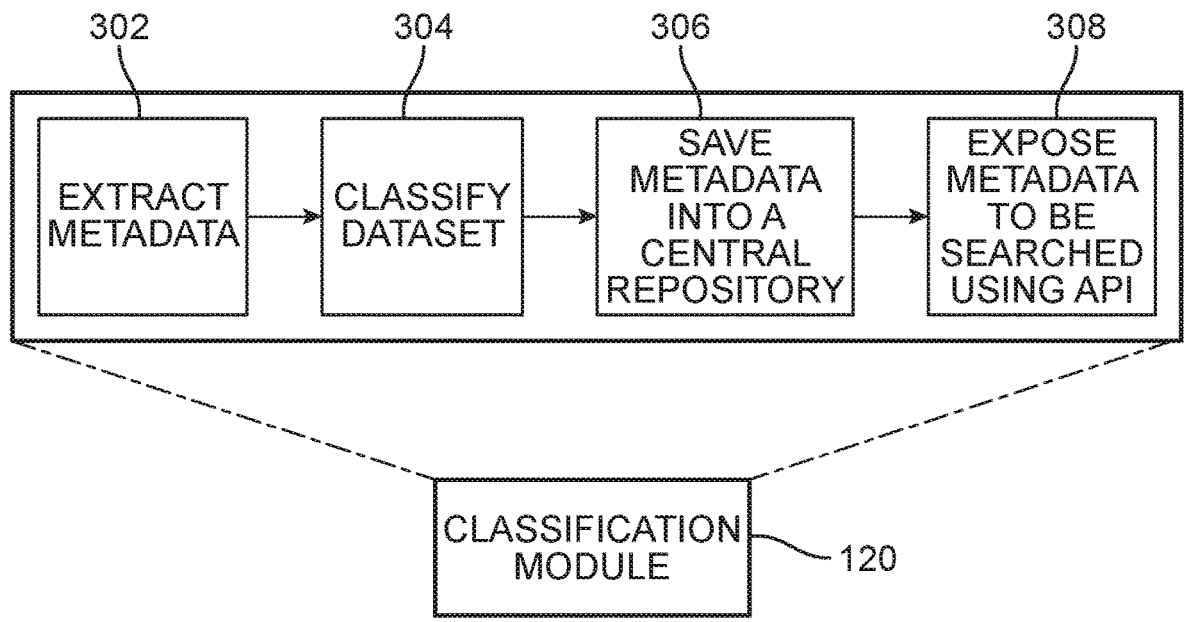
FIG. 3 is a schematic diagram indicating various tasks performed by the classification module of FIG. 1, according to an embodiment.

FIG. 3 depicts a schematic view of various tasks that may be performed by classification module 120 as it extracts metadata and classifies the corresponding dataset. For example, as part of a first task 302, classification module 120 may automatically capture or extract metadata from the raw dataset. Examples of categories of metadata that may be extracted include business metadata, technical metadata and operational metadata. Business metadata can include, but is not limited to: data fingerprints; header information; schema information; relationship and hierarchy management information; entity and parts-of-speech information; subject, keywords, sentiment and opinions; business terms; synonyms, acronyms and legal names; definitions and external links; semantic information; sensitive information (personal identification information and personal health information, for example); and users and personas information. Technical metadata can include, but is not limited to: structural information; statistical information (counts, mean, etc. of various fields); uniqueness information; keys and constraints; and empty/null and duplication information. Operational metadata can include, but is not limited to: dataset lineage information; data lifecycle information; audit information; and access usage information.

As part of a second task 304, classification module 120 may classify the dataset. Classification can be performed using one or more machine learning algorithms, including supervised and/or unsupervised learning algorithms. Thus, in some embodiments, classification module 120 may be trained on datasets with known targets (answers) to help the module learn to identify different kinds of data and classify the data according to various different classification schemes. As one example, classification module 120 may use the extracted metadata to classify the dataset as "shared" or "restricted". Classification module 120 could also classify datasets as "sensitive" or not. Such classifications are exemplary and are not intended to be limiting. In other cases, any other suitable classifications could be used. Moreover, in some cases, datasets can be associated with two or more classifications.

As part of a third task 306, classification module 120 may save the metadata, classification information (i.e., designated classifications), along with any tags and/or labels into a central repository (e.g., central repository 220 of FIG. 2). In some cases, classification module 120 may automatically generate tags and/or labels for the dataset before saving the dataset to the central repository, in order to facilitate searching. As part of a fourth task 308, classification module 120 may expose the metadata to searching using an application programming interface (API). This allows other modules to access the metadata to facilitate further processing.

Figure 4:
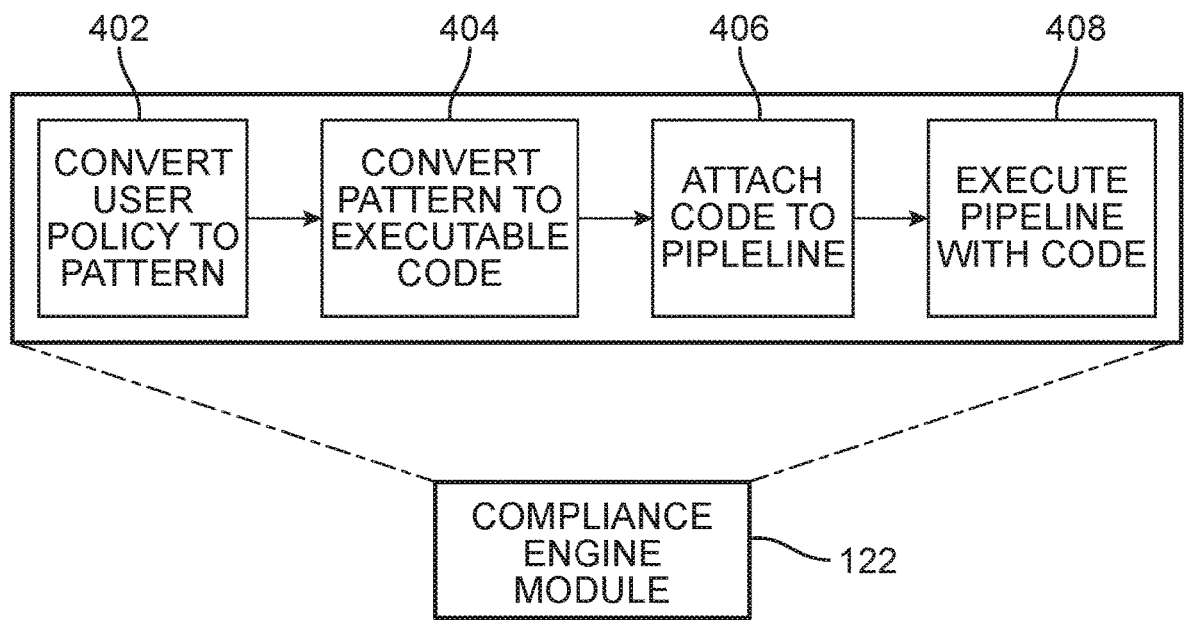
FIG. 4 is a schematic diagram indicating various tasks performed by the compliance engine module of FIG. 1, according to an embodiment.

FIG. 4 depicts a schematic view of various tasks that may be performed by compliance engine module 122 after classification module 120 has finished processing the dataset. Compliance engine module 122 may perform various tasks related to applying one or more data policies to the raw dataset. For example, as part of a first task 402, compliance engine module 122 may convert a specific data policy that has been entered into the governance portal by a user into a pattern. Here the term "pattern" refers to a schema, such as a Domain Specific Language, that provides a common format for defining data rules/policies. A pattern may be seen as an intermediate product in the process of converting natural language descriptions of data policies to executable code.

As part of a second task 404, compliance engine module 122 may convert the pattern into executable code. Executable code can be provided in any suitable language. In some embodiments, the executable code may be provided as code that is executable within the Apache Spark framework.

As part of a third task 406, compliance engine module 122 may attach the executable code to a data pipeline associated with the raw dataset. Then, as part of a fourth task 408, compliance engine module 122 may execute the data pipeline with the attached executable code.

In some embodiments, compliance engine module 122 may make a call to a searchable database (e.g., central repository 220) to retrieve the information needed for performing one or more of these tasks. Specifically, compliance engine module 122 could retrieve any data policies selected by users, as well as various data attributes for the dataset that have been previously determined by the classification module 120.

As part of its output, compliance engine module 122 generates curated data that can be stored in a curated zone of the data lake, as described above. This curated data may then be processed by modules further downstream, including data quality control module 124, data harmonization and unification module 126 and universal integration and consumption module 128.

Figure 5:
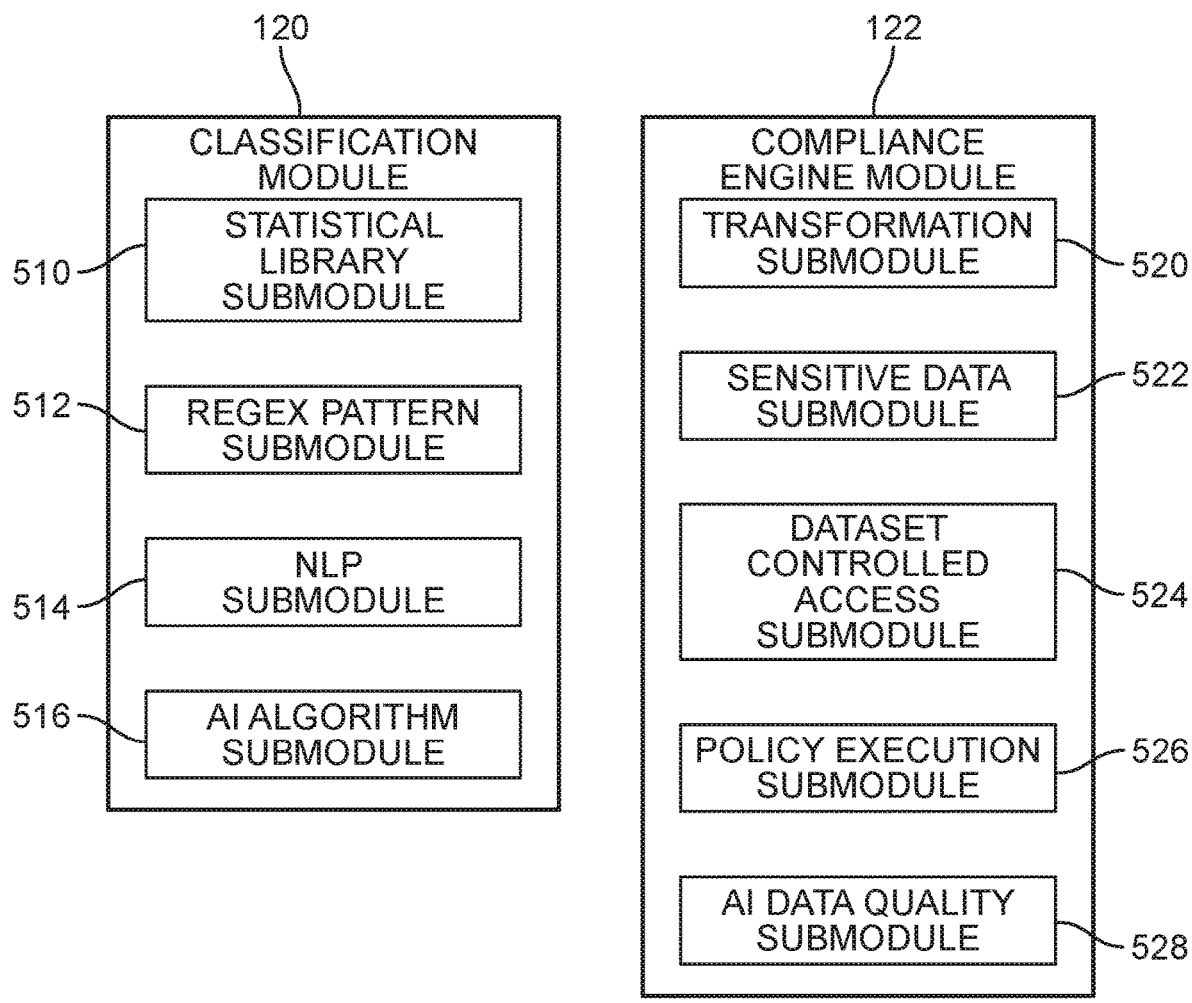
FIG. 5 is a schematic diagram of two modules of FIG. 1 along with their submodules, according to an embodiment.

As seen in FIG. 5, classification module 120 and compliance engine module 122 may be further comprised of various submodules that facilitate achieving the tasks described above and depicted in FIGS. 3-4. For example, classification module 120 can include a statistical library submodule 510. This submodule provides a statistical library that can be used extract all types of technical and correlational metadata. Classification module 120 also includes a Regex pattern submodule 512. This submodule has a regex pattern library that can extract all kinds of patterns and business information from the datasets. Classification module 120 also includes a Natural Language Processing (NLP) submodule 514. This submodule can be used to extracts entities like personal names, organization names, and location details from the dataset. Classification module 120 also includes an AI algorithm submodule 516 that provides recommendations for what kinds of data policies can be executed on the dataset. In some cases, these recommendations are then fed into compliance engine module 122, which is responsible for applying the data policies.

As seen in FIG. 5, compliance engine module 122 may include a transformation submodule 520 may be used to mask, encrypt or anonymize any data fields within the datasets. A sensitive data submodule 522 may be used to detect any personally identify information (PII) data using an AI algorithm and classify it into "Shared" and "Restricted" category. A dataset controlled access submodule 524 may be used to provide persona-based access control to various data sets/tables. A policy execution submodule 526 may be used to select required data policies at the dataset or column level. An AI data quality submodule 528 may be used to extract and classify information that may be useful for downstream modules, such as data quality control module 124.

Figure 6:
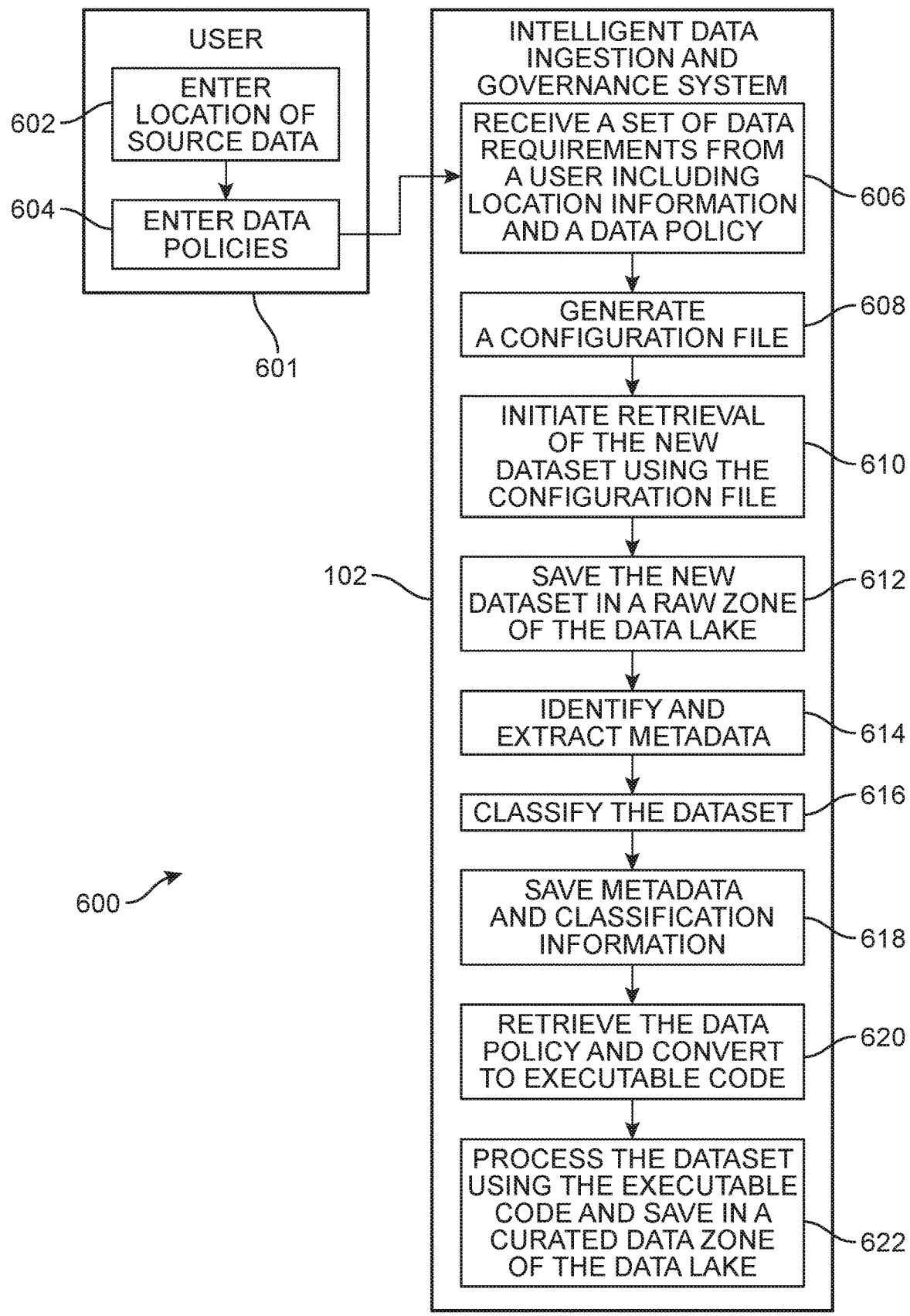
FIG. 6 is a schematic view of a process for ingesting and processing data, according to an embodiment.

FIG. 6 depicts a schematic view of a process 600 for classifying and transforming data to automatically create curated data within a data lake, according to an embodiment. As depicted in FIG. 6, some steps may be performed manually by a user of the system, while other steps may be performed automatically by the system itself (e.g., by system 102). It may be appreciated that the following steps can be accomplished using any of the modules described above (and depicted, for example, in FIG. 1).

The process beings in step 602 where a user 601 may enter a location of the source data they wish to be retrieved and stored within the data lake. Next, in a step 604, user 601 may enter one or more data policies. In some cases, data policies may be selected from a predetermined menu, or list. Because it may be impossible to anticipate all possible data policies that a user may want to enact for their data, the exemplary system also allows users to enter customized data policies using natural language. These customized data policies can then be converted into a pattern, as described above, and eventually translated into executable code. As described above, a user may interface with a portal, such as governance portal 116, in order to enter information about the data.

Although the exemplary process depicts the user entering location information and data policy information, a user could also enter additional information into a governance portal as part of registering a new dataset to be stored in a data lake. For example, users may provide the format of data to be retrieved (e.g., CSV, binary, etc.) using the governance portal. Users may also provide meta data information (such as whether the data contains headers, the requested data refreshing frequency, etc.). Users may also provide data staging information, data quality information (such as whether the user wants to use automated data quality checks), and other suitable data registration information through the governance portal.

In step 606, system 102 receives any entered information as a set of data requirements from the user. The set of data requirements can include location information, format information, one or more data policies, and/or any other suitable information necessary for retrieving and managing the dataset.

In step 608, system 102 generates a configuration file that includes information about the set of data requirements. These data requirements may include, but are not limited to: staging information, ingestion information (including location, format and access information for the data), data policy information and other suitable information that may be required and used by any other modules in the system. The configuration file is then used in step 610 to initiate retrieval of the new data set, as already described above.

Next, in step 612, the new dataset is saved in a raw zone of the data lake. This provides an unmodified version of the data that can be reprocessed at a later time. In some cases, datasets in the raw zone may also provide backup in case the curated data becomes corrupted.

In step 614, system 102 identifies and extracts metadata. This extracted information is then used in step 616 to classify the dataset (or some subset of the dataset, such as a particular column in a data set).

In step 618, the metadata and classification information may be saved to a central repository. Based on the classification of the dataset, system 102 may then retrieve an appropriate data policy and convert that policy into executable code in step 620. Finally, in step 622, the dataset is processed using the executable code and saved in a curated data zone of the data lake.

Figure 7:
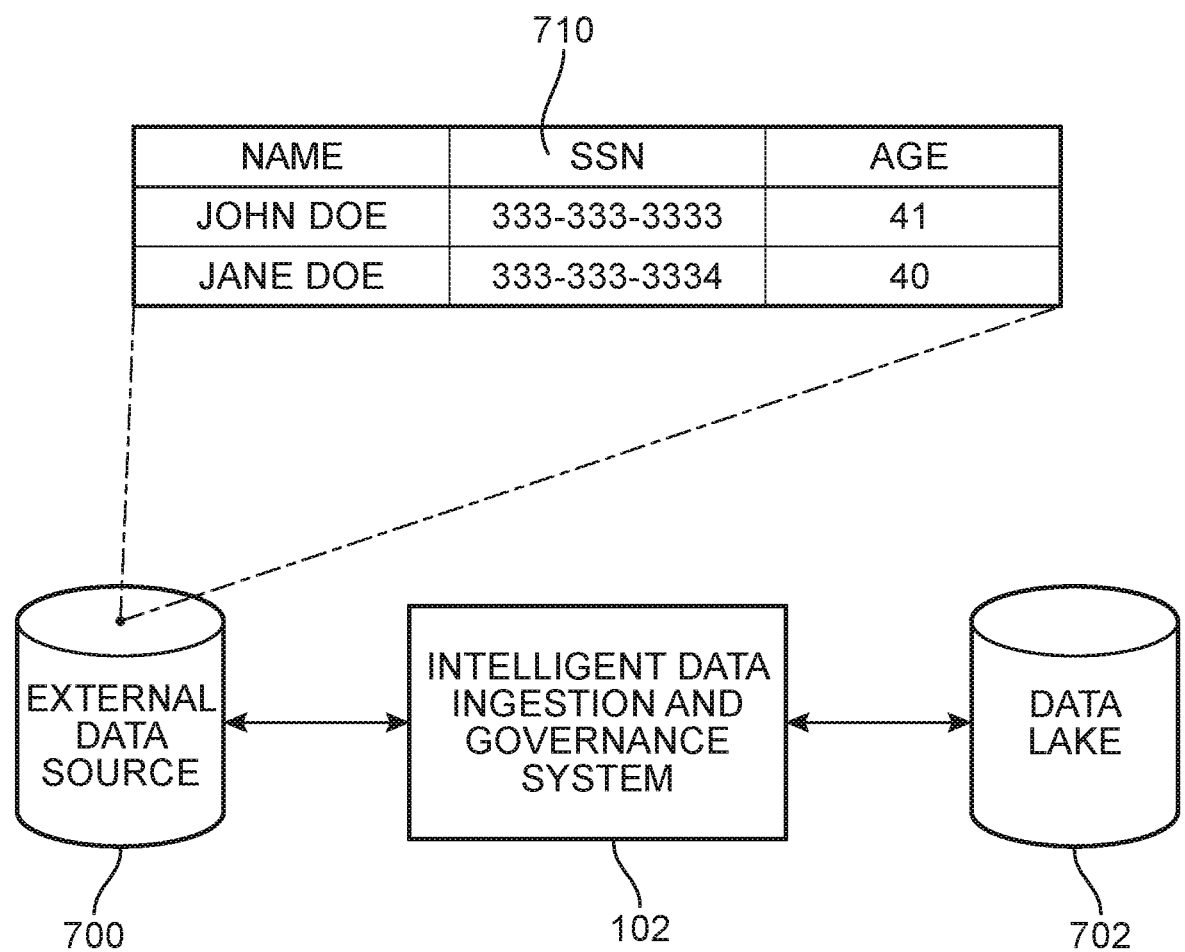
FIG. 7 is a schematic view of a setup where a user would like to bring a dataset with sensitive information into a data lake using an intelligent data ingestion and governance system, according to an embodiment.
Figure 8:
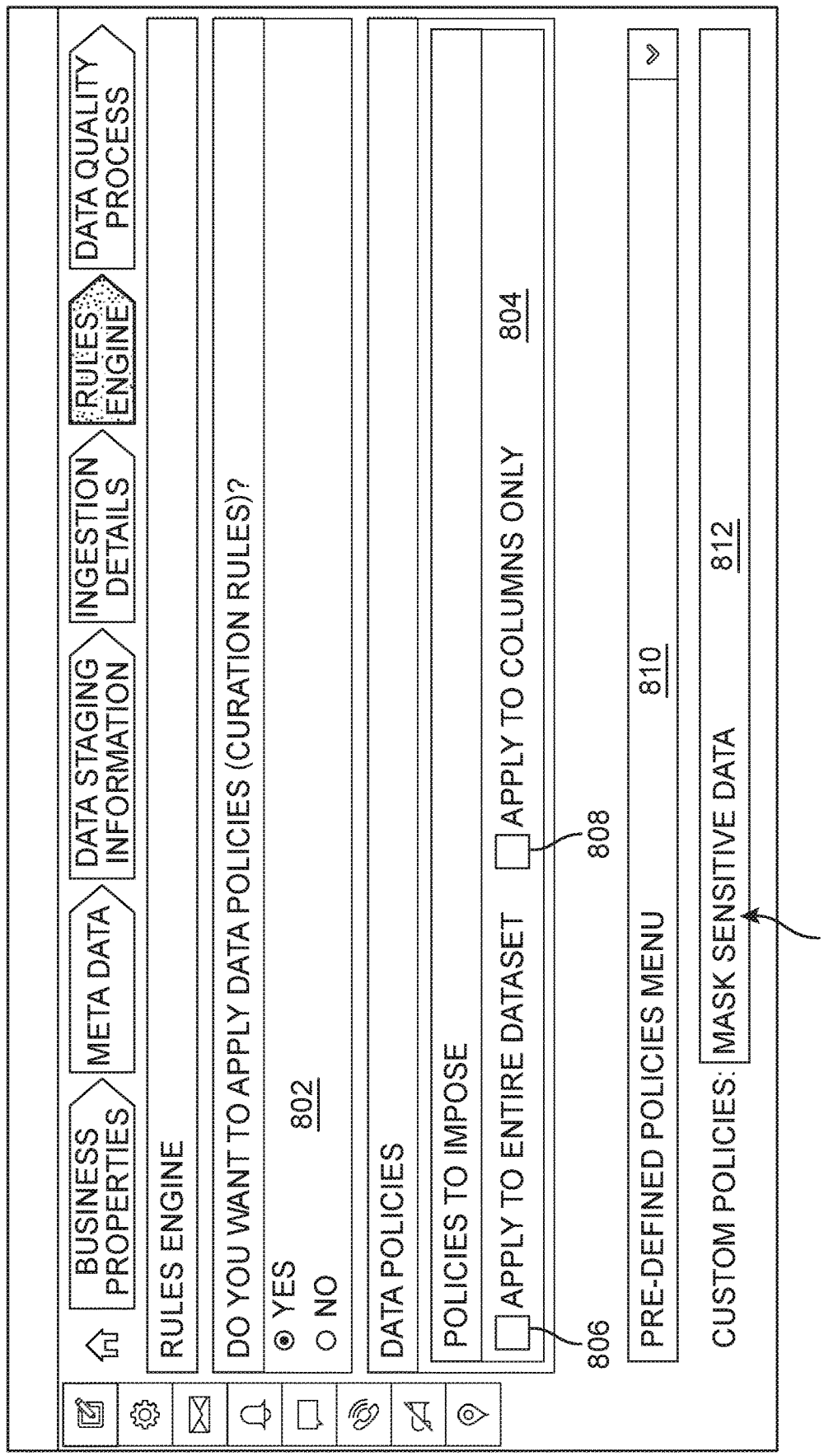
FIG. 8 is a schematic view of a screenshot of a governance portal, according to an embodiment.
Figure 9:
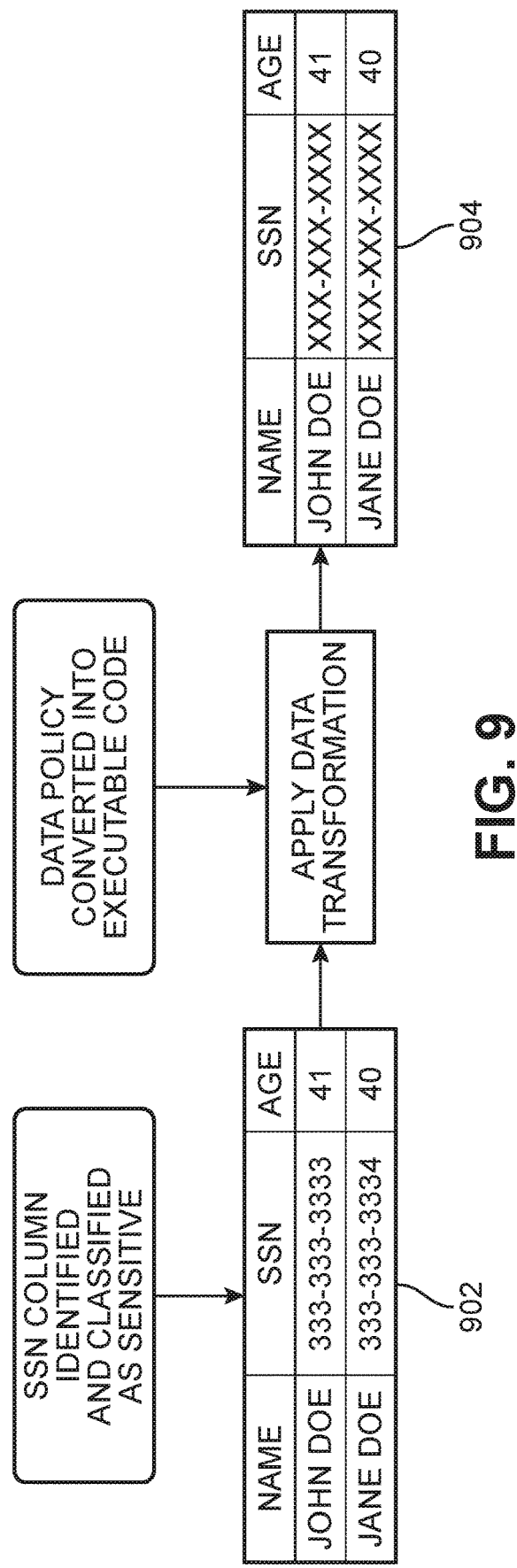
FIG. 9 is a schematic view indicating how sensitive data may be processed, according to an embodiment.

FIGS. 7-9 depict schematic views of some steps in the process depicted in FIG. 6 based on a potential use case. In this example, a user desires to have a new external data source 700 added to a data lake 702 that is managed by intelligent data ingestion and governance system 102. External data source 700 is seen to contain several data fields, including a social security number field (SSN) 710.

In order to register the new data source, the user may use an intelligent governance portal, which may be generated and/or managed by an intelligent governance portal module. A schematic screenshot of an exemplary web interface for a governance portal is depicted in FIG. 8. As seen in FIG. 8, a user is prompted regarding data policies, which may also be referred to as data curation rules. Specifically, a first menu item 802 asks if a user wants to apply data policies (data curation rules). A second menu item 804 provides a user with the option to apply the policies to the entire dataset (selection 806) or to individual columns (selection 808).

Further options for adding specific policies/rules are also indicated in FIG. 8. In this example, users have the option to select one or more pre-defined policies from a dropdown menu 810. Pre-defined policies can be provided for commonly used tasks.

Users also have the option to provide custom policies in an input box 812. Custom policies, also referred to as user specified policies, can be provided in a natural language format, since system 102 is capable of translating natural language policies into executable code, as already discussed. In the exemplary embodiment, a user has input a custom policy 814. This policy is specified as "mask sensitive data". In other cases, a user could specify one or more particular fields to be masked (for example, "mask social security numbers").

FIG. 9 is a schematic view of how the system transforms the data based on the specified policy (i.e., custom policy 814) shown in FIG. 8. In particular, after ingesting the source data, the system will automatically identify the metadata and automatically classify the SSN column as "sensitive". In addition, the system will automatically retrieve an appropriate policy for "sensitive" information, which in this case is given by the custom policy 814 in FIG. 8. This data policy ("mask sensitive information") is then automatically converted into executable code. The executable code is then used to apply the appropriate data transformation to the raw dataset 902. In this case, the system "masks" the SSN data by converting the numbers to a series of X's. The result is curated dataset 904. The curated dataset 904 can then be exposed for searching by external users. When the data is retrieved, the SSN information will be hidden, thereby ensuring that sensitive information is not exposed during searches of curated data by external users.

Because the disclosed system uses dynamic processes for classifying datasets and executing appropriate data policies, the system will dynamically adapt to changes in the relationships between different datasets within the data lake. As new datasets are added to the data lake, or as new relationships are made between existing datasets in the data lake, the classification of a dataset (or of a field within the dataset) may change. For example, a data field containing usernames may not be originally classified as sensitive. However, if that data field is later related to other data fields, such as a home address or credit score, the usernames (or related fields) may now be considered sensitive since its unwise to allow users searching the database to see all that information in a single context (that is, a name, address and/or credit score). Thus, it may be appreciated that as the context of the underlying datasets in the data lake changes, the system may dynamically reprocess the datasets according to any newly applicable data policies. Likewise, as the context changes, the system could reprocess the datasets to undo the transformations resulting from data policies that are no longer applicable (e.g., unmask data that is no longer considered sensitive).

Figure 10:
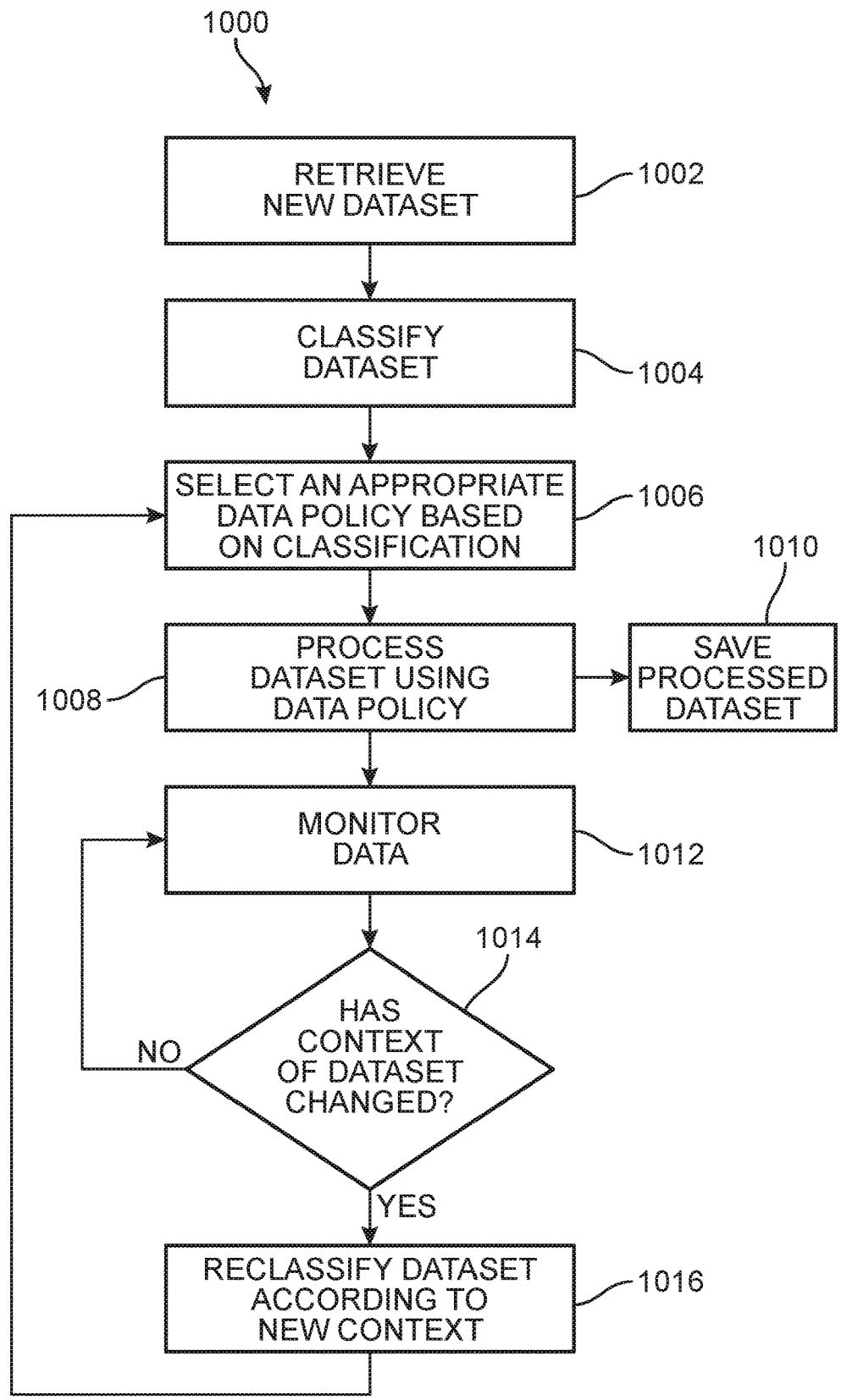
FIG. 10 is a schematic view of another process for ingesting and processing data, according to an embodiment.

FIG. 10 is a schematic view of a process for automatically reclassifying datasets as the context of the dataset in the data lake changes. As user herein, context may refer to the relation of the dataset to one or more other datasets.

In a first step 1002, a new dataset is retrieved. Next, in step 1004, the new dataset is classified. In step 1006, the system selects an appropriate data policy based on the classification and then processes the dataset using the selected data policy in step 1008. The processed (i.e., curated) dataset may then be saved in step 1010.

After processing and saving the data, the system may continue to monitor one or more datasets in the data lake in step 1012. This step of monitoring could occur at any suitable frequency. In step 1014, the system checks if the context of the dataset has changed. If not, the system returns to step 1012 to continue monitoring data in the data lake. If so, the system proceeds to step 1016 to reclassify the dataset according to the new context.

Once the data is reclassified, the system returns to step 1006 to select an appropriate data policy based on the reclassification. The system then proceeds to step 1008 to process the dataset according to the newly selected data policy. This reprocessed data can then be saved as new curated data in the data lake in step 1010. The system may repeat one or more of these steps to continue monitoring and reprocessing the dataset as the context of the dataset continues to evolve over time.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for intelligent data ingestion and governance within a data repository, comprising:

receiving a set of data requirements for a new dataset from a user, the set of data requirements including location information for a data source, a first data policy associated with a first data classification, and a second data policy associated with a second data classification;
automatically generating a configuration file using the received set of data requirements;
automatically initiating retrieval of the new dataset from the data source using the generated configuration file;
automatically saving the retrieved dataset in the data repository;
automatically identifying and extracting a set of metadata from the retrieved dataset;
automatically classifying the retrieved dataset and identifying the retrieved dataset with the first data classification;
automatically saving the set of metadata and the first data classification;
automatically retrieving, based on the first data classification for the retrieved dataset, the first data policy from the configuration file and converting the first data policy into executable code;
automatically processing the retrieved dataset using the executable code to generate a first curated dataset;
automatically saving the first curated dataset in the data repository, wherein the first curated dataset is accessible to one or more users;
automatically determining that a context of the retrieved dataset has changed;
automatically reclassifying the retrieved dataset according to the change in context of the dataset and identifying the retrieved dataset with the second data classification;
automatically retrieving based on the second data classification for the retrieved dataset, the second data policy from the configuration file and converting the second data policy into new executable code;
automatically reprocessing the retrieved dataset using the new executable code to generate a new curated dataset; and
automatically saving the new curated dataset in the data repository.

2. The method according to claim 1, wherein the retrieved dataset is stored in a data lake.

3. The method according to claim 1, wherein the first data classification indicates that the retrieved dataset includes sensitive information.

4. The method according to claim 3, wherein the first data policy comprises a rule for hiding the sensitive information in the retrieved dataset.

5. The method according to claim 1, wherein the first data policy is specified in natural language by the user and wherein converting the first data policy into executable code comprises processing the data policy using natural language processing.

6. The method according to claim 1, wherein the first data policy is converted into a pattern, and wherein the pattern is further converted into the executable code.

7. The method according to claim 6, wherein the executable code is attached to a data pipeline.

8. The method according to claim 1, wherein context of the retrieved dataset is dependent on relationships with other datasets in the data repository.

9. A system for intelligent data ingestion and governance, the system comprising:
a device processor; and
a non-transitory computer readable medium storing instructions that are executable by the device processor to:
receive a set of data requirements for a new dataset from a user, the set of data requirements including location information for a data source, a first data policy associated with a first data classification, and a second data policy associated with a second data classification;
generate a configuration file using the received set of data requirements;
initiate retrieval of the new dataset from the data source using the generated configuration file;
save the retrieved dataset in the data repository;
identify and extract a set of metadata from the retrieved dataset;
classify the retrieved dataset and identifying the retrieved dataset with the first data classification;
save the set of metadata and the first data classification;
retrieve, based on the first data classification for the retrieved dataset, the first data policy from the configuration file and converting the first data policy into executable code;
process the retrieved dataset using the executable code to generate a first curated dataset;
save the first curated dataset in the data repository, wherein the first curated dataset is accessible to one or more users;
determine that a context of the retrieved dataset has changed;
reclassify the retrieved dataset according to the change in context of the dataset and identify the retrieved dataset with the second data classification;
retrieve based on the second data classification for the retrieved dataset, the second data policy from the configuration file and convert the second data policy into new executable code;
reprocess the retrieved dataset using the new executable code to generate a new curated dataset; and
save the new curated dataset in the data repository.

10. The system according to claim 9, wherein the system further includes a classification module and a compliance engine module and wherein the classification module recommends data policies to the compliance engine module based metadata in the retrieved data.

11. The system according to claim 10, wherein the compliance engine module generates a compliance engine using the data policies recommended by the classification module.

12. The system according to claim 11, wherein the classification of the retrieved dataset is controlled by artificial intelligence processing.

13. The system according to claim 9, wherein determining that the context of the retrieved dataset has changed includes determining that the retrieved dataset includes sensitive information.

14. The system according to claim 9, wherein the system further comprises a data quality control module for monitoring the quality of retrieved datasets.

15. The system according to claim 9, wherein the system further comprises a module that generates a knowledge graph for the retrieved dataset.

16. The system according to claim 9, wherein the set of data requirements includes a format for the retrieved dataset.

17. The system according to claim 10, wherein the classification module stores the metadata on a central repository and makes the metadata accessible on the central repository to other modules using an application programming interface.

18. The system according to claim 17, wherein the compliance engine module can access the metadata for the retrieved dataset on the central repository using the application programming interface.

19. The system according to claim 10, wherein the compliance engine module includes a sensitive data submodule for masking sensitive data in the retrieved dataset.

20. A non-transitory computer-readable medium storing software comprising instructions executable by one or more computers which, upon such execution, cause the one or more computers to:
receive a set of data requirements for a new dataset from a user, the set of data requirements including location information for a data source, a first data policy associated with a first data classification, and a second data policy associated with a second data classification;
generate a configuration file using the received set of data requirements;
initiate retrieval of the new dataset from the data source using the generated configuration file;
save the retrieved dataset in the data repository;
identify and extract a set of metadata from the retrieved dataset;
classify the retrieved dataset and identifying the retrieved dataset with the first data classification;
save the set of metadata and the first data classification;
retrieve, based on the first data classification for the retrieved dataset, the first data policy from the configuration file and converting the first data policy into executable code;
process the retrieved dataset using the executable code to generate a first curated dataset;
save the first curated dataset in the data repository, wherein the first curated dataset is accessible to one or more users;
determine that a context of the retrieved dataset has changed;
reclassify the retrieved dataset according to the change in context of the dataset and identify the retrieved dataset with the second data classification;
retrieve based on the second data classification for the retrieved dataset, the second data policy from the configuration file and convert the second data policy into new executable code;
reprocess the retrieved dataset using the new executable code to generate a new curated dataset; and
save the new curated dataset in the data repository.

* * * * *